United States Patent [19]

Nagasaka et al.

[11] Patent Number: 5,383,708
[45] Date of Patent: Jan. 24, 1995

[54] CHILD SEAT AND ANCHORING STRUCTURE FOR MOUNTING THE CHILD SEAT ONTO VEHICLE SEAT

[75] Inventors: Chikao Nagasaka; Tokuhiro Amano, both of Aichi, Japan

[73] Assignee: Kabushiki Kaisha Tokai Rika Denki Seisakusho, Aichi, Japan

[21] Appl. No.: 25,231

[22] Filed: Mar. 2, 1993

[30] Foreign Application Priority Data

Mar. 13, 1992 [JP] Japan ................... 4-054735

[51] Int. Cl.$^6$ ............................................. B60N 2/26
[52] U.S. Cl. .................................................. 297/250.1
[58] Field of Search ............ 297/250.1, 476–480, 297/485, 252, 253, 256.15, 256.16, 256.17, 254–256, 273–275, 352, 4, 217, 251

[56] References Cited

U.S. PATENT DOCUMENTS

| 2,548,238 | 4/1951 | Potts et al. | 297/250.1 X |
| 3,791,694 | 2/1974 | Roberts et al. | 297/250.1 |
| 3,910,634 | 10/1975 | Morris | 297/250.1 X |
| 3,915,402 | 10/1975 | Takada | 297/476 X |
| 4,529,249 | 7/1985 | Ino | 297/474 |
| 4,583,253 | 4/1986 | Hall | 297/250.1 X |
| 4,688,849 | 8/1987 | Tsuge et al. | 297/475 X |
| 4,861,105 | 8/1989 | Merten et al. | 297/256.17 |
| 4,958,887 | 9/1990 | Meeker | 297/256.17 |

FOREIGN PATENT DOCUMENTS

| 0796598 | 10/1968 | Canada | 297/475 |
| 295838A1 | 12/1988 | European Pat. Off. . | |
| 343704A3 | 11/1989 | European Pat. Off. . | |
| 2318056 | 2/1977 | France . | |
| 2712917 | 9/1978 | Germany | 297/250.1 |
| 3809007A1 | 10/1988 | Germany . | |
| 2-54736 | 4/1990 | Japan . | |
| 4-35931 | 3/1992 | Japan . | |
| WO86/02050 | 4/1986 | WIPO . | |
| 9001882 | 3/1989 | WIPO | 297/250.1 |

OTHER PUBLICATIONS

European Search Report, Application No. 93103350.0, dated Jun. 30, 1993.

Primary Examiner—Peter R. Brown
Assistant Examiner—Milton Nelson, Jr.
Attorney, Agent, or Firm—Fisher & Associates

[57] ABSTRACT

A child seat mounted on and secured to a vehicle seat. The vehicle seat is provided with a fixed member. An engaging member is provided on the child seat main body such that the engaging member is engageable with the fixed member and is able to be withdrawn from and retracted into the child seat main body.

19 Claims, 10 Drawing Sheets

CHILD SEAT AND ANCHORING STRUCTURE FOR MOUNTING THE CHILD SEAT ONTO VEHICLE SEAT

BACKGROUND OF THE INVENTION

1. Field of the Invention

The present invention relates to a child seat which is placed on and secured to a vehicle seat.

2. Description of the Related Art

Conventionally, a child seat has been employed when an infant rides in a car. In general, the child seat was secured to a vehicle seat by means of the vehicle's seat belt device.

Figure 11:
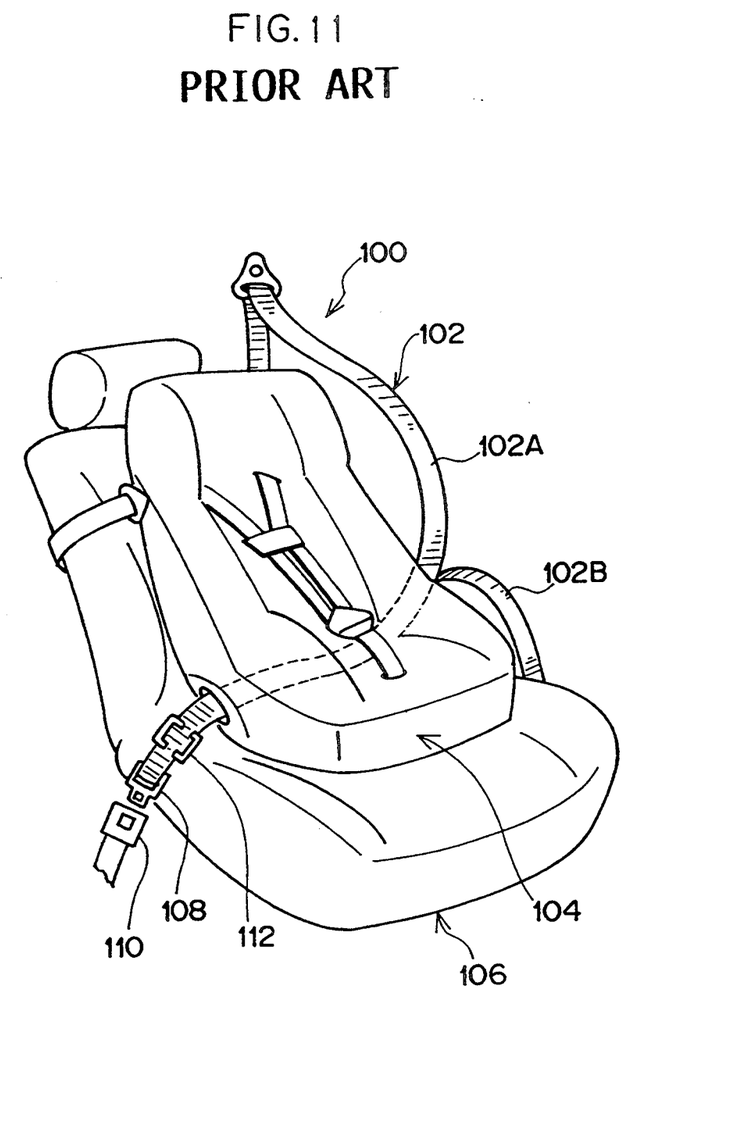
FIG. 11 is a perspective view showing a conventional anchoring structure of a child seat.

FIG. 11 shows the state in which a child seat 104 is secured to a vehicle seat 106 by employing a webbing 102 of a three point seat belt device 100. As indicated in FIG. 11, the child seat 104 is secured to a vehicle seat 106 by engaging a tongue plate 108 with a buckle device 110 after a shoulder webbing 102A and a lap webbing 102B are overlapped onto each other and inserted through the lower portion of the child seat 104.

However, in the securing structure of the child seat using the webbing 102 of the seat belt device 100, the securing process is complicated. In addition, since the securing structure only prevents the withdrawal of the webbing 102 at the time of the rapid deceleration of the vehicle due to the use of a generally commercialized retractor of an ELR type, there is a possibility that the child seat 104 will move from its fixed position after being secured to the vehicle seat 106.

Further, this structure has the disadvantage in that the securing process is complicated since it is necessary to use a substantially E-shaped locking clip 112 for overlapping the shoulder webbing 102A and the lap webbing 102B.

On the other hand, another securing structure not shown has been considered in which a securing member for securing a child seat projects from the vehicle seat on the side of the child seat. The child seat is then secured to the securing member in a simple manner. However, this structure requires the position of the child seat to be predetermined, thereby resulting in a complicated structure and an increase in cost.

SUMMARY OF THE INVENTION

In view of the above-described facts, it is an object of the present invention to provide a child seat which can be surely anchored to a vehicle seat in a simple manner and without using vehicle seat webbings.

The present invention discloses a child seat which is mounted on and anchored to a vehicle seat, and comprises a child seat main body and an engaging means which is attached to the child seat main body. The engaging means can engage a fixed means attached to the vehicle seat and can be withdrawn from and retracted into the child seat main body.

In accordance with the present invention with the above-described construction, the following procedures are performed when the child seat is anchored to the vehicle seat.

First, the child seat main body is mounted on the vehicle seat. Next, the engaging means is withdrawn from the child seat (the child seat main body may also be mounted on the vehicle seat after the engaging means has been previously withdrawn). Then, the engaging means is engaged with the fixed means attached to the vehicle seat. Thereafter, the engaging means is retracted into the child seat main body. Thus, the child seat main body is anchored to the vehicle seat.

In this case, using the engaging means greatly facilitates the engaging operation with the fixed means. Accordingly, the anchoring operation of the child seat main body to the vehicle seat is facilitated. Also, the engaging means can be withdrawn from and retracted into the child seat main body. In addition, the engaging means can be retracted after being engaged with the fixed means so as to firmly anchor the child seat main body to the vehicle seat. Moreover, because the present invention is not of a construction that fixes the child seat main body to the vehicle seat by using a webbing, it is possible to solve problems arising from a displacement from a fixed position and complications in the fixing process.

In accordance with another aspect, the present invention comprises a locking means which is provided in the child seat main body and prevents the movement of the engaging means when the engaging means is engaged with the fixed means and retracted into the child seat main body.

In the present invention with the above-described construction, because the locking means is provided to prevent the movement of the engaging means when the engaging means is engaged with the fixed means and simultaneously retracted into the child seat main body, the above-described anchoring state of the child seat main body to the vehicle seat is further ensured.

As described above, the child seat according to the present invention has an excellent effect in that the child seat is firmly anchored to a vehicle seat in a simple manner and without using a vehicle seat webbing.

DESCRIPTION OF THE PREFERRED EMBODIMENTS

Referring to FIGS. 1 to 4, a child seat 10 according to the first embodiment of the present invention will be hereinafter described.

Figure 1:
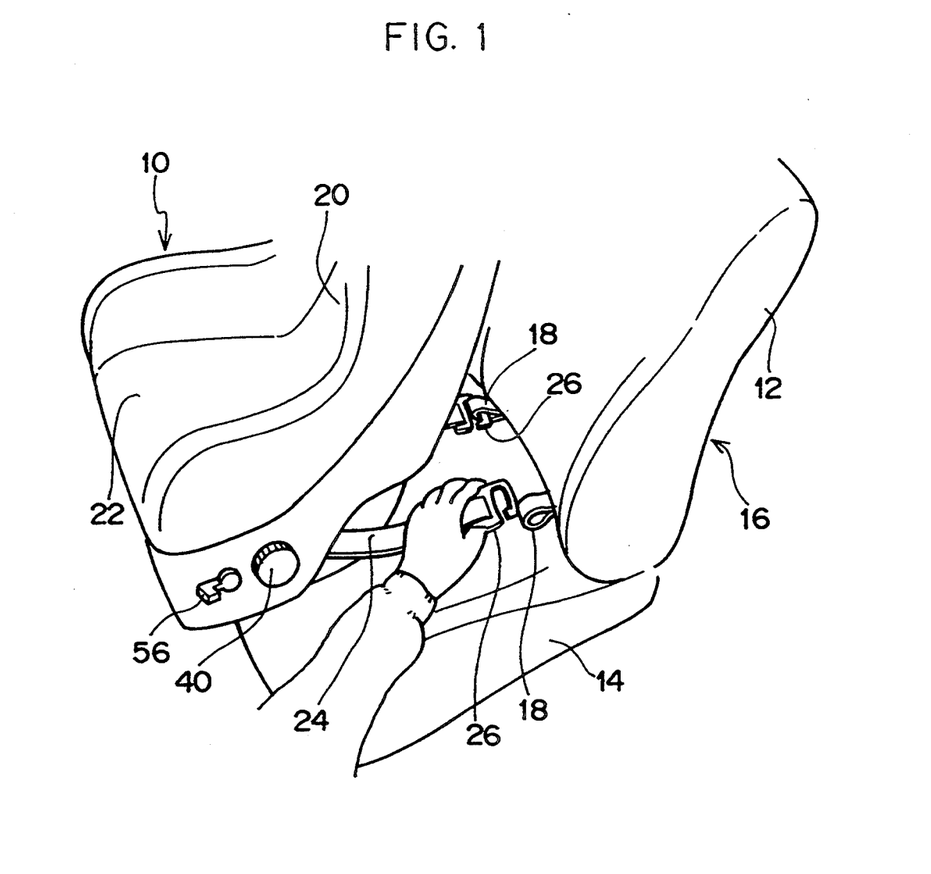
FIG. 1 is a perspective view of a state before a child seat, according to the first embodiment of the present invention, is anchored to a vehicle seat.
Figure 2:
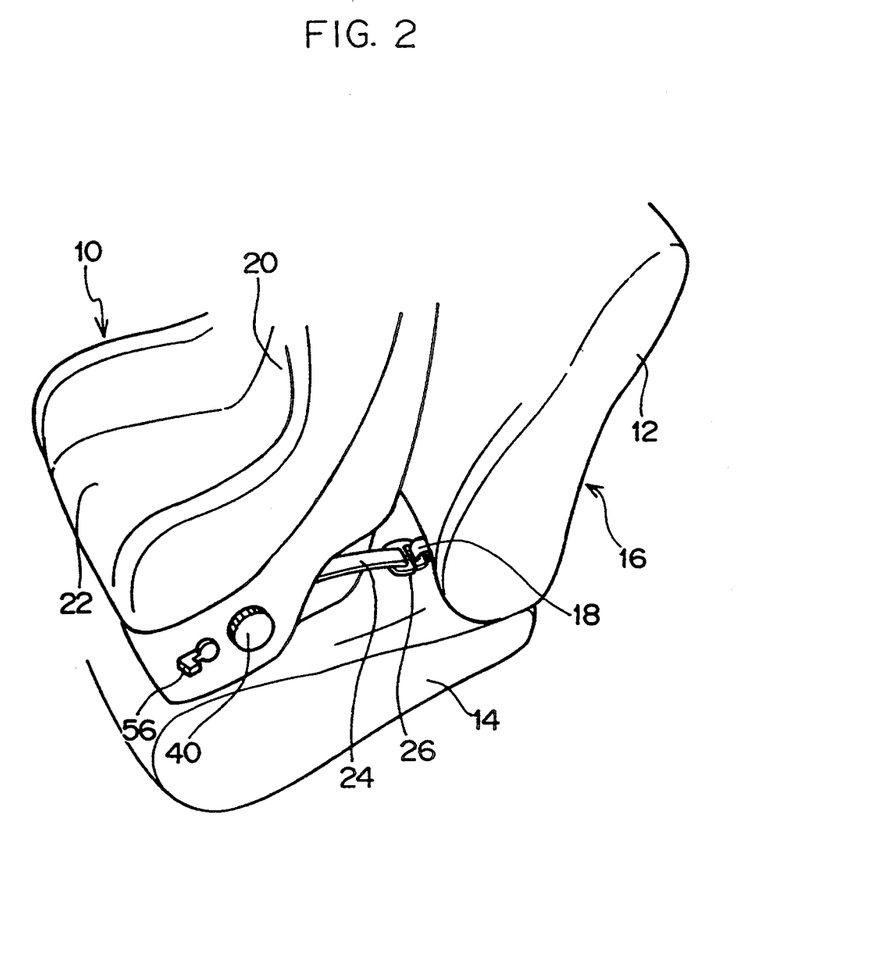
FIG. 2 is a perspective view of a state in which the child seat is anchored to the vehicle seat.

As shown in FIGS. 1 and 2, a vehicle seat 16 comprising a seat back 12 and a seat cushion 14 includes two loop-shaped supporting belts 18 respectively disposed on the right and left sides of a lower end portion of the seat back 12.

Figure 3:
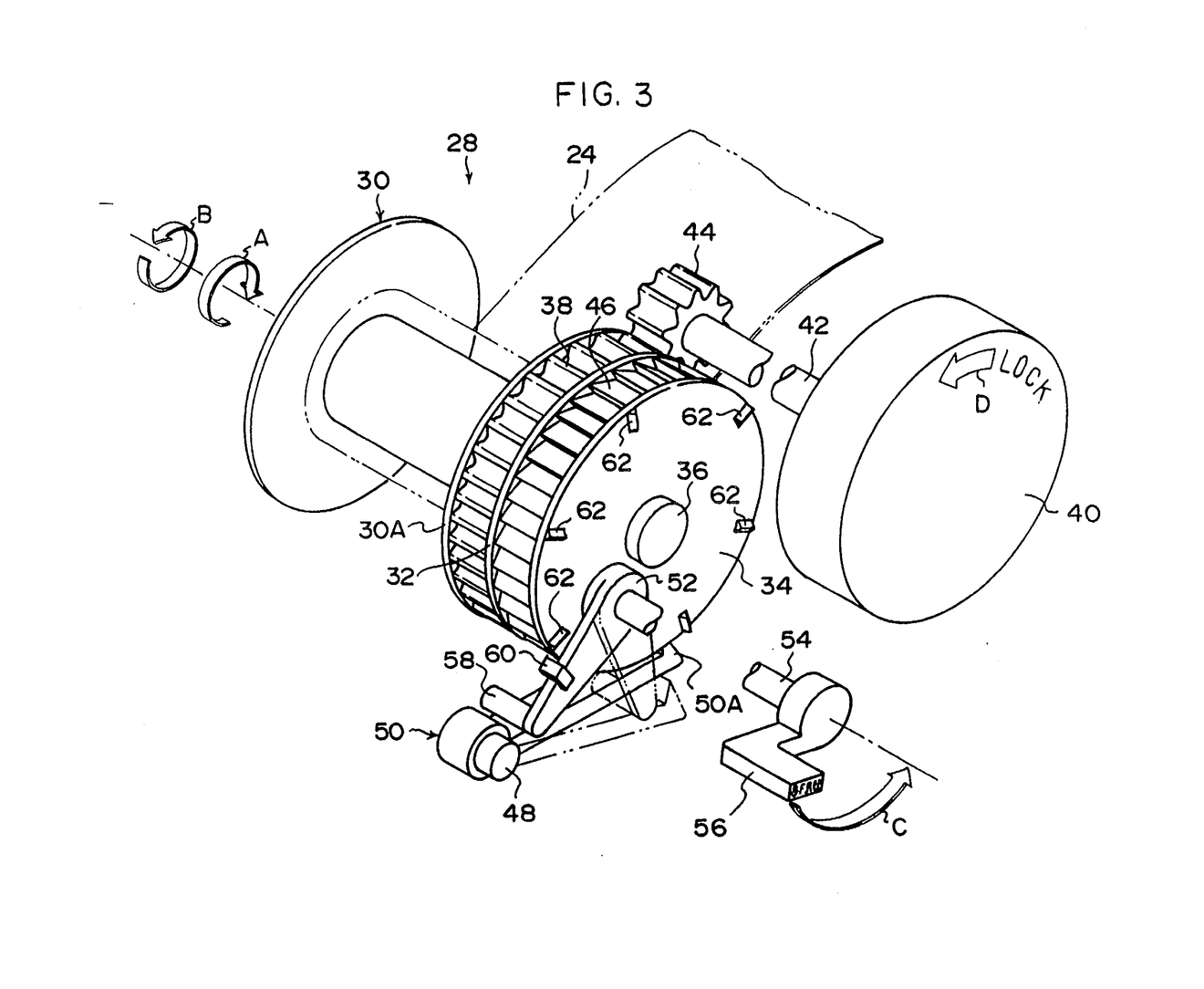
FIG. 3 is a perspective view of a reel which retracts an anchoring belt shown in FIGS. 1 and 2.

The child seat 10 comprising a seat back 20 and a seat cushion 22 includes two anchoring belts 24 which are respectively disposed on the right and left sides of the lower portion of the child seat 10. In FIGS. 1 and 2, a webbing for restraining a child or the like in the child seat 10 is not shown. Each anchoring belt 24 corresponds to the supporting belt 18. A hook 26, which is attached to one end of the anchoring belt 24, is engageable with the supporting belt 18 by inserting the supporting belt 18 through the open portion of the hook 26. As shown in FIG. 3, the other end of the anchoring belt 24 is retracted onto a reel 28 which is disposed within the child seat 10.

Also, as shown in FIG. 3, the reel 28 includes a spool 30, to which the other end of the anchoring belt 24 is fastened so as to be retracted onto the spool in the form of a layer. In the vicinity of one end of the spool 30, in its axial direction, a disc-shaped partition plate 32 and an outer plate 34 are disposed at a predetermined interval and are fixed to a shaft 36 which penetrates through these plates coaxially with the center shaft portion of the spool 30.

A gear 38 is fixed between one side plate 30A of the spool 30 and the partition plate 32, coaxially with the shaft 36. The gear 38 engages a small gear 44 which is connected to an operation knob 40 disposed at the lower side of the child seat 10, via a shaft 42. Also, a ratchet wheel 46 is fixed between the partition plate 32 and the outer plate 34, coaxially with the shaft 36.

The ratchet wheel 46 corresponds to a pawl 50A of the lock lever 50 which is supported axially by a pin 48. The lock lever 50 is constantly urged in the direction of being engaged with the teeth portion of the ratchet wheel 46 by the urging force of a helical coil spring (not shown). Therefore, the pawl 50A of the lock lever 50 is normally engaged with the teeth portion of the ratchet wheel 46. The rotation of the spool 30 is thereby allowed in the retracting direction (indicated by arrow A in FIG. 3), but is prevented in the withdrawal direction (indicated by arrow B in FIG. 3).

Figure 4:
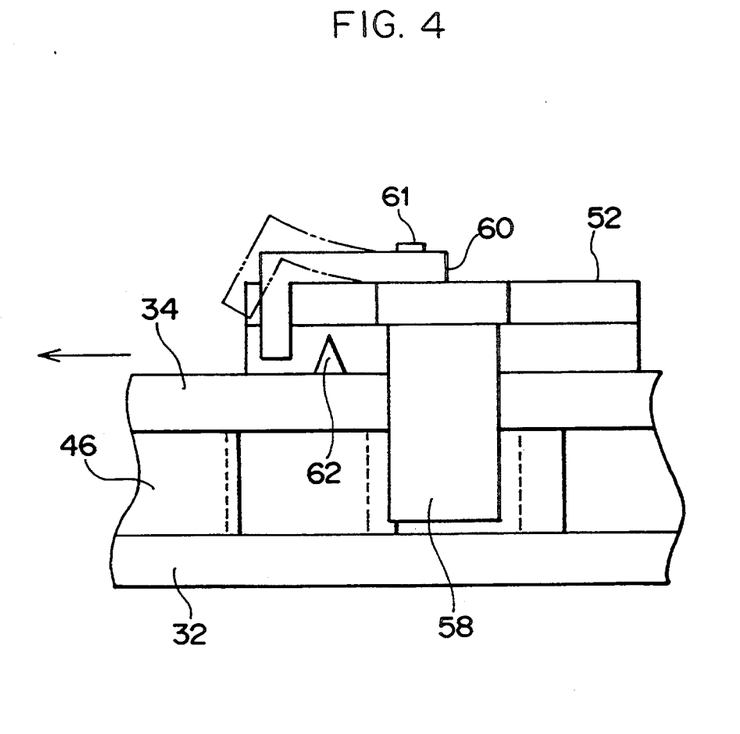
FIG. 4 is a side view of a cam shown in FIG. 3 as seen from the side of a release pin.

A cam 52 is disposed slightly apart from the outer plate 34 in the axial direction and at a position eccentric from the shaft 36. The cam 52 is connected coaxially to an operation lever 56 via a shaft 54. Accordingly, the cam 52 rotates only by the operation of the operation lever 56 and has no relation to the rotation of the spool 30. A cylindrical release pin 58 is disposed at one end of the cam 52, and abuts the upper end surface of the lock lever 50. In addition, the release pin 58 can engage the pawl 50A of the lock lever 50. As shown in FIG. 4, a substantially L-shaped interference strip 60 is fixed to the cam 52 by means of a pin 61 in the vicinity of the release pin 58. The interference strip 60 can be elastically deformed, and interferes at predetermined time intervals with a plurality of triangle-shaped interference projections 62 which are disposed at predetermined intervals in the vicinity of the periphery of one side wall of the outer plate 34.

That is, since the interference strip 60 is located outside of the outer plate 34 (in the normal condition as shown in FIG. 3), the interference strip 60 does not interfere with these interference projections 62. However, when the operation lever 56 is rotated in a direction indicated by arrow C, as indicated in FIG. 3, the cam 52 is rotated in the same direction so that the release pin 58 of the cam 52 pushes down the lock lever 50 in order to move the lock lever 50 away from the teeth portion of the ratchet wheel 46. At the same time, the interference strip 60 is located in the vicinity of the outer periphery of one side wall of the outer plate 34 due to the eccentricity of the cam from the shaft 35, thereby allowing the interference strip 60 to interfere with the interference projections 62.

The following is a description of the procedure for anchoring the child seat 10 to the vehicle seat 16 according to the present embodiment.

First, as shown in FIG. 1, the child seat is placed on the seat cushion 14 of the vehicle seat 16. Next, the operation lever 56 is rotated by an operator in a direction indicated by arrow C in FIG. 3. This causes the cam 52 to rotate in the direction of arrow C and causes the release pin 58 to push down the lock level 50, which engages the teeth portion of the ratchet wheel 46, against the urging force of the helical coil spring. The lock lever 50 is thereby disengaged from the teeth portion of the ratchet wheel 46. Accordingly, the spool 30 can be rotated in the directions of retracting the belt (a direction indicated by arrow A in FIG. 3) and withdrawing the belt (a direction indicated by arrow B in FIG. 3). Meanwhile, in the state in which the cam 52 has pushed down the lock lever 50, the urging force of the helical coil spring holds the pawl 50A in a position in which the pawl 50A is not engaged with the ratchet wheel 46 (the position shown by the two-dot chain line in FIG. 3), and the interference strip 60 of the cam 52 is positioned in the vicinity of the outer periphery of one side wall of the outer plate 34.

In this state, the hook 26 of the anchoring belt 24 is withdrawn to a predetermined length by an operator, so as to engage the hook 26 with the supporting belt 18 which is attached to the vehicle seat 16. Thereafter, the operation knob 40 is rotated in the direction indicated by arrow D in FIG. 3. The gear 38 is thereby rotated in the retracting direction via a small gear 44 so that the anchoring belt 24 is retracted in layer form onto the spool 30 in proportion to the amount that the operation knob 40 was rotated.

In this case, at the initial step of retracting the anchoring belt 24, the interference strip 60 of the cam 52, which is positioned in the vicinity of the outer periphery of one side wall of the outer plate 34, interferes with an interference projection 62 of the outer plate 34. Then, as shown in FIG. 4, the interference of the interference projection 62 with the interference strip 60 causes the cam 52 to rotate by a predetermined amount in the direction opposite (indicated by an arrow in FIG. 4) to that indicated by arrow C in FIG. 3, thereby allowing the lock lever 50 to be released from being pushed down by the release pin 58 of the cam 52. Thus, the lock lever 50 again engages the teeth portion of the ratchet wheel 46 by means of the urging force of the helical coil spring. Accordingly, when an operator rotates the operation knob 40 in the retracting direction, the anchoring a belt 24 can be retracted only, thereby being prevented from being withdrawn. Meanwhile, when the interference strip 60 of the cam 52 rotates by a predetermined amount, it elastically deforms as indicated by the two-dot chain line in FIG. 4 and passes over the interference projection 62 so as to be positioned outside of the periphery of the outer plate 34.

In the above-described manner, the anchoring belt 24 is retracted until the seat back 20 of the child seat 10 closely contacts the seat back 12 of the vehicle seat 16, thereby, completing the anchoring operation of the child seat 10 to the vehicle seat 16 (see FIG. 2).

To release the child seat 10 from the vehicle seat 16, the above-described operation is performed in reverse.

Thus, since in the present embodiment the child seat 10 is provided with the anchoring belt 24 which can be retracted and withdrawn, the anchoring belt 24 can easily engage the supporting belt 18. Moreover, the child seat 10 can be surely and stably anchored to the vehicle seat 16 by taking up slack through the retracting of the anchoring belt 24 after engagement. That is, the present embodiment is a construction in which the anchoring belt 24 attached to the child seat 10 is anchored to the supporting belt 18, and not the conventional method of securing a child seat 104 by using the vehicle seat webbing 102 (see FIG. 11). Therefore, the present embodiment can prevent problems such as not using a locking clip 112 (see FIG. 11), making an error in positioning the webbing 102 properly, and improper mounting, such as looseness of the webbing 102, due to the use of an ELR-type retractor.

Also, since the anchoring belt 24 and the supporting belt 18 are both band-shaped members (belt), the engagement of these belts can be performed without being affected by differences of vehicle seats 16 due to vehicle type.

Further, by using the supporting belt 18 a lower cost, lighter child seat can be achieved.

In addition, even if a rigid fixed member is fixed the vehicle seat 16 for the anchoring belt 24 of the child seat 10, the child seat can be attached to the vehicle seat in a simple manner and without being influenced by the weight of the child seat 10.

Also, since the spool 30 of the reel 28 is prevented from rotating in the withdrawal direction during a normal condition, the anchoring state of the anchoring belt 24 cannot be loosened after the child seat 10 is anchored. Therefore, the position in which the child seat 10 is anchored cannot be displaced.

Further, because the lock lever 50 automatically engages the ratchet wheel 46 by means of the rotation of the spool 30 in the retraction direction in comparison with the construction in which the lock lever 50 is re-engages the ratchet wheel 46 by an operator, the present invention has the advantage in that there is no possibility of forgetting the anchoring operation.

Figure 5:
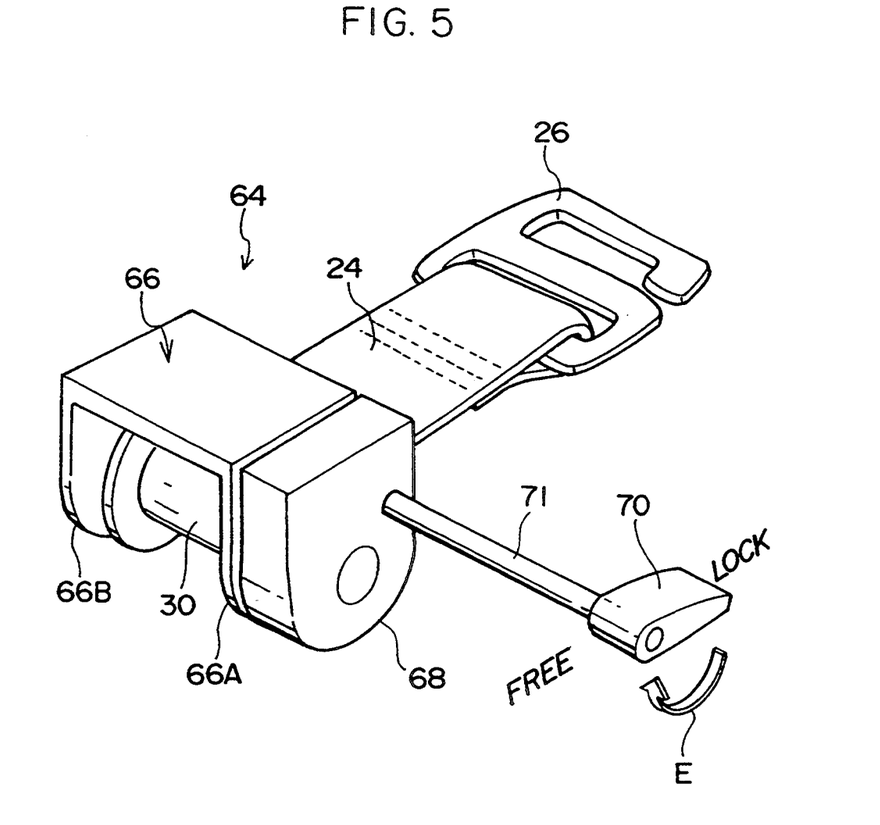
FIG. 5 illustrates a perspective view of a second embodiment of the present invention showing a retractor as a modified example of a reel.

Next, a second embodiment of the present invention as illustrated in FIG. 5 will be described below. This embodiment has a feature in that a well-known ALR-type retractor 64 is employed instead of the reel 28 of the first embodiment. The same elements as those of the above-described first embodiment are given like reference numbers so a description thereof is omitted.

The retractor 64 has a substantially rectangular flange 66. A winding shaft (not shown) is supported rotatably by a pair of leg plates 66A, 66B of the frame 66. The spool 30 is fixed to the winding shaft so as to be coaxial therewith. The spool 30 rotates together with the winding shaft so as to retract the anchoring belt 24 one end of which is attached thereto. The other end of the anchoring belt 24 has a hook 26 attached thereto. A case 68 is fixed to the outer surface of one leg plate 66A. The case 68 accommodates a ratchet wheel, a lever which engages the ratchet wheel, a cam for releasing the engagement of the lever and the ratchet wheel, a power spring, and the like. A shaft 71 of an operation lever 70 penetrates through the case 68. The above-mentioned cam is fixed to one end of the shaft 71. Accordingly, the operation level 70 is operated so that the ratchet wheel and the lever are either engaged with or separated from each other. When the anchoring belt 24 is withdrawn to its full length, the operation lever 70 which has been released from being locked (in a free state) is restored to a locked state.

In accordance with the above-described construction, when the child seat 10 is anchored to the vehicle seat 16, the operation lever 70 is rotated in a direction indicates by arrow E in FIG. 5 from its position as indicated in FIG. 5. The ratchet wheel and the lever are thereby released from being in a locked state making the winding shaft rotatable in either the direction of retracting or withdrawal. In this state, the anchoring belt 24 is withdrawn to its full length, thereby allowing the hook 26 to be engaged with the supporting belt 18 of the vehicle seat 16. Also, when the anchoring belt 24 is withdrawn to its full length, the operation level 70 automatically rotates in the opposite direction to that indicated by arrow E in FIG. 5 so that the ratchet wheel and the level are again brought into a locked state. After the hook 26 is engaged with the supporting belt 18, the urging force of the power spring in the retractor 64 causes the anchoring belt 24 to retract, thereby allowing the child seat 10 to be anchored to the vehicle seat 16 by taking up slack. The vibration, or the like during the running of the vehicle also causes the anchoring belt 24 to retract to some degree. The anchored state thereby further stabilized.

The structure of the second embodiment achieves the same advantages as the above-described first embodiment. In addition, there the advantage of the anchoring belt being retracted and thereby further stabilizing the child seat 10, due to vehicle vibration when the retractor is of an ALR type.

Figure 6:
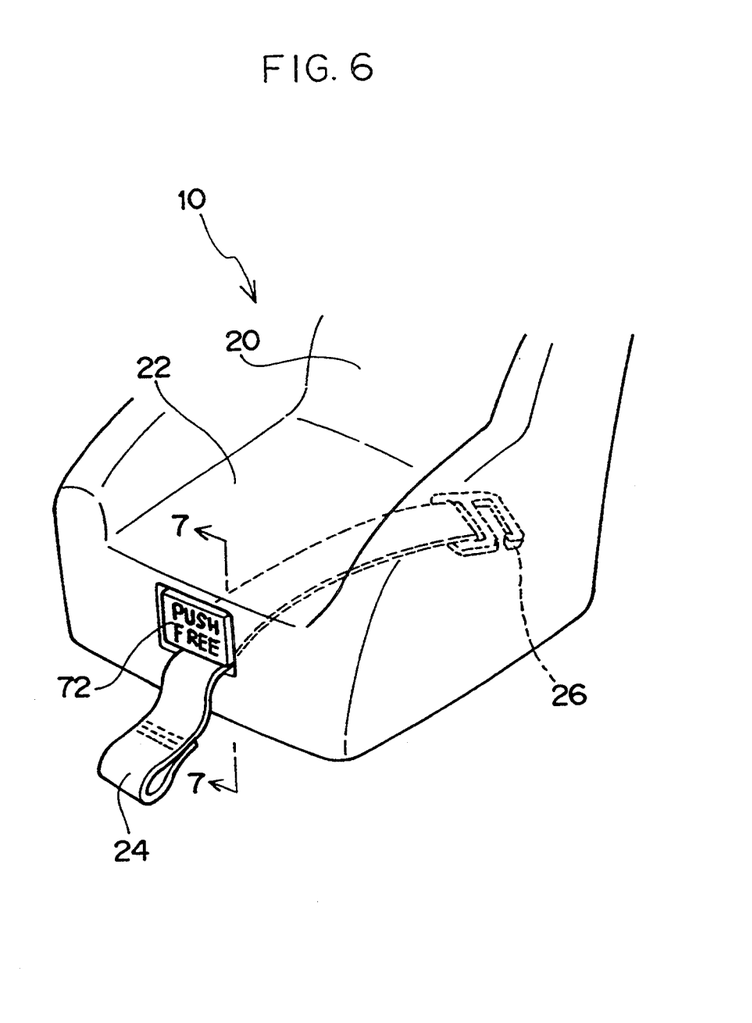
FIG. 6 illustrates an outside perspective view of a third embodiment of the present invention showing a construction of the clamping of an anchoring belt by an operation lever.
Figure 7:
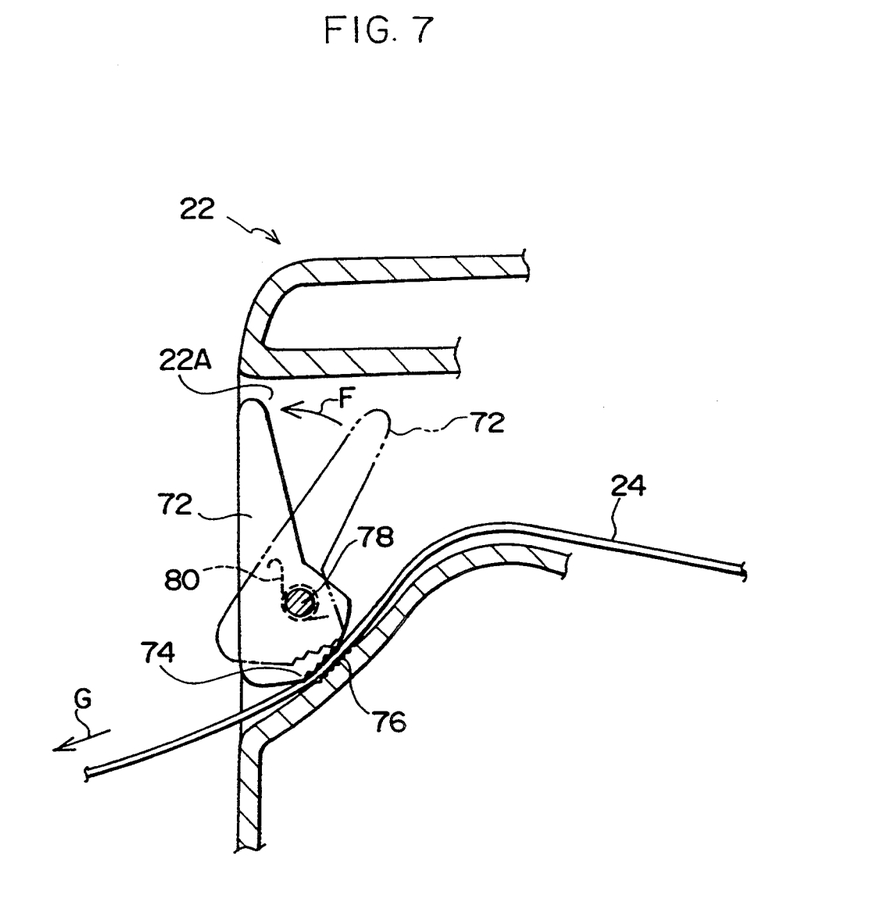
FIG. 7 is a sectional view taken along the line 7—7 of FIG. 6.

A third embodiment of the present invention illustrated in FIGS. 6 and 7 is described below. The same elements as those of the above-described first embodiment are given like reference numbers, and the description thereof is omitted.

This embodiment has a feature in that it is not a construction where the anchoring belt 24 is retracted onto a reel 28 as described in the first embodiment, or the like. Instead, the anchoring belt 24 is clamped so as to prevent withdrawal.

That is, an operation lever 72 is pivotably disposed in the vicinity of the front end of a seat cushion 22 of a child seat 10. Clamping teeth 74 are formed in the lower end portion of the operation lever 72. Clamping teeth 76 are formed in the child seat cushion 22 so as to correspond to clamping teeth 74. In addition, a helical coil spring 80 is wound around the shaft 78 of the operation lever 72. One end of the spring 80 is engaged with a pin (not shown) of the operation lever 72 and the other end is secured to a side wall 22A of the child seat cushion 22. Accordingly, the helical coil spring 80 constantly urges the operation lever 72 in the direction indicated by arrow F in FIG. 7. Normally, the clamping teeth 74 of the operation lever 72 and the clamping teeth 76 of the child seat cushion 22 clamp the anchoring belt 24 which is lodged therebetween.

According to the above-described construction, in order to withdraw the anchoring belt 24, the operation level 72 must be pushed in the direction opposite to that indicated by arrow F in FIG. 7. The operation lever 72 is thus brought into the state indicated by the two-dot chain line in FIG. 7, which releases the anchoring belt 24 from the state of being clamped by the clamping teeth 74 of the operation lever 72 and the clamping teeth 76 of the child seat cushion 22. Next, the hook 26 of the anchoring belt 24 is engaged with the supporting belt 18 which is attached to the vehicle seat 16. Thereafter, the operation lever 72 is pressed and simultaneously the anchoring belt 24 is withdrawn in the forward direction of the vehicle (the direction indicated by arrow G in FIG. 7). In this state, the child seat 10 is pressed down toward the seat back 12 of the vehicle seat 16. Thereafter, when the operation lever 72 is released from the state of being pressed down, the anchoring belt 24 is automatically clamped between the clamping teeth 74 and 76 by means of the urging force of the helical coil spring 80. The child seat 10 is thus anchored to the vehicle seat 16.

This structure of the third embodiment also achieves the same advantages as those of the above-described embodiments. Moreover, a reduced number of parts makes for a child seat of simple structure. Therefore, it is possible to reduce costs and improve assembly.

Figure 8:
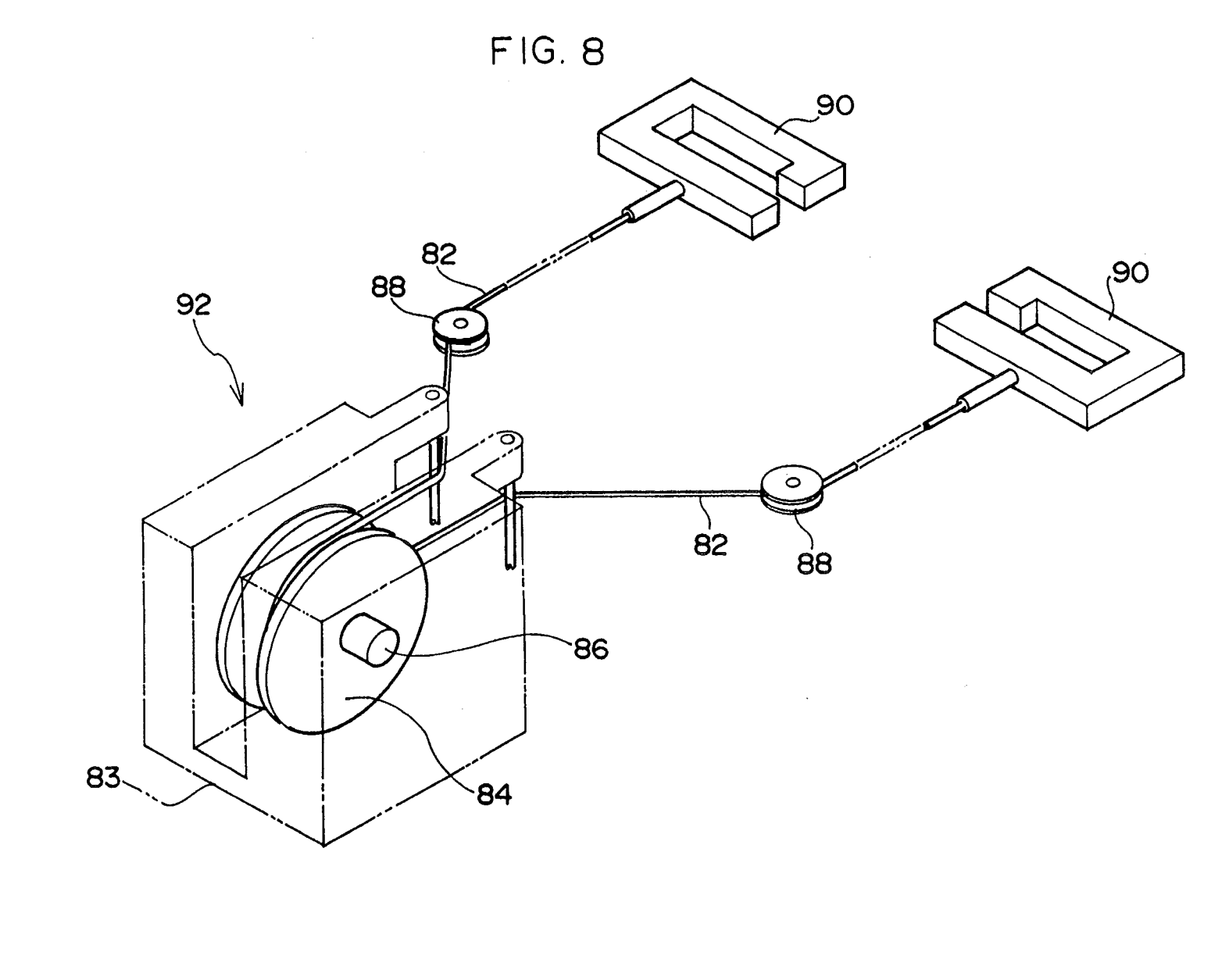
FIG. 8 illustrates a perspective view of a fourth embodiment of the present invention showing a wire as a modified example of an anchoring belt and a retractor winding the wire.

The following is a description of a fourth embodiment of the present invention as illustrated in FIG. 8.

This embodiment has a feature of using a wire 82 instead of an anchoring belt 24.

That is, a retractor 92 comprises a housing 83 which supports a wire retracting drum 84 via a rotating shaft 86. In the vicinity of one end of the rotating shaft 86 of the drum 84, a construction, which was described in the first embodiment (an operation lever 40, a small gear 44, a gear 38, a ratchet wheel 46, a lock lever 50, a cam 52, an operation lever 56, and the like), is provided. The construction which was described in the second embodiment may be utilized instead of that of the first embodiment. The leading ends of two wires 82 withdrawn from the drum 84 are connected to two substantially rectangular-shaped hooks 90. Intermediate portions of the wires 82 are wound around pulleys 88.

This construction achieves the same effects as that of the above-described first embodiment. In comparison with the construction using the anchoring belt 24, the use of the 82 enables a reduction of space. Further, it has an advantage in that one retractor 92 is enough for retraction even when two sets of hooks 90 and wires 82 are employed.

The above-described embodiments employ a loop-shaped supporting belt 18 in the vehicle seat 16. However, the present invention is not limited to such a belt, and may use any rigid member which can be engaged for support.

Figure 9:
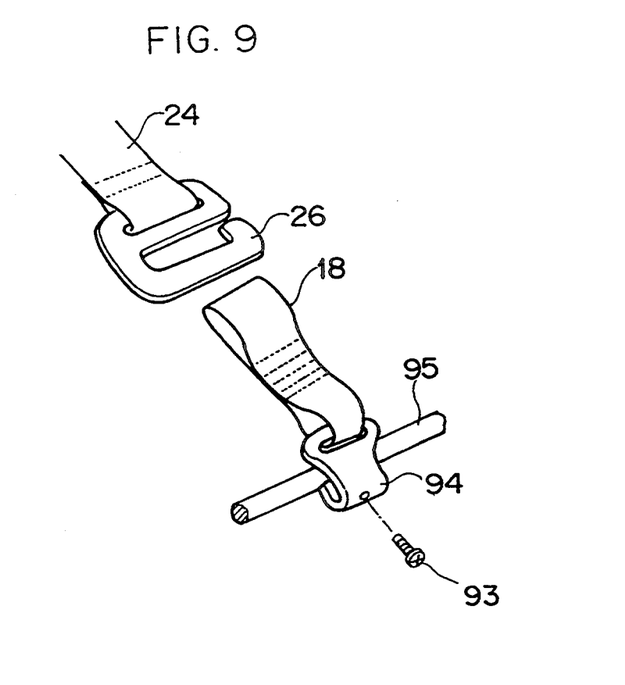
FIG. 9 is a perspective view showing a modified example of connecting and securing a loop attached to a vehicle seat to a connecting rod.

When a supporting belt 18 is employed, an anchor plate 94 is provided at an end portion of the supporting belt 18 on the vehicle seat 16 side as illustrated in FIG. 9. A connecting rod 95 disposed in the vehicle seat 16 engages the bent end portion provided in the anchor plate 94. In this state the connecting rod 95 may be prevented from moving by tightening a screw 93. This can improve support rigidity of the supporting belt 18 and restraint performance of the child scat 10 during rapid deceleration of the vehicle.

Figure 10A:
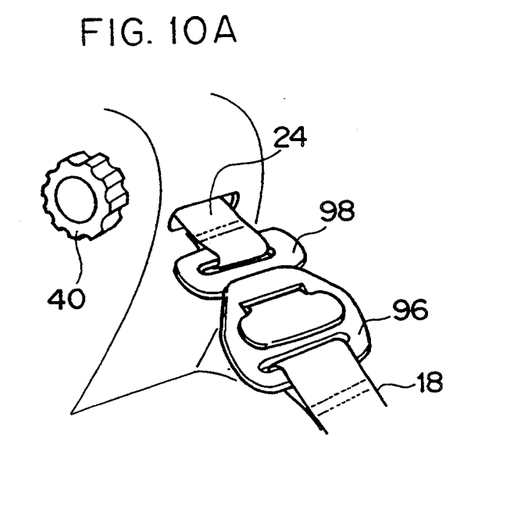
FIG. 10A illustrates a perspective view of a modified example of the loop and a hook of the anchoring belt shown in FIG. 9, showing the state in which a hook member is engaged with a metal latch.
Figure 10B:
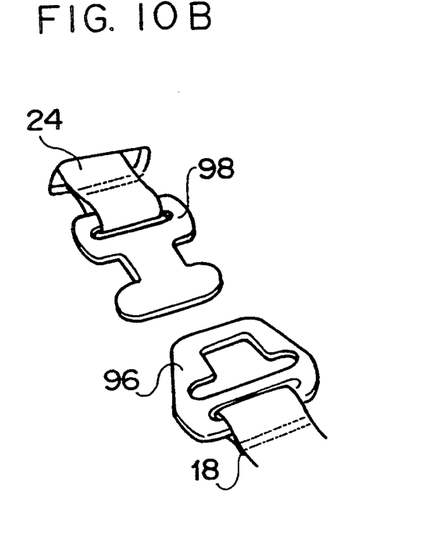
FIG. 10B illustrates a perspective view of a modified example of the loop and the hook of the anchoring belt shown in FIG. 9, showing the state in which the hook member is released from the metal latch.

Although the above-described embodiments are constructions in which the supporting belt 18 is engaged by the hook 26 (or the hook 90), the present invention is not limited to these constructions. A construction may be used in which a latch 95 is provided on the leading end of a supporting belt 18 and a substantially H-shaped hook member 98 engages the latch 95, as illustrated in FIGS. 10A and 10B.

What is claimed is:

1. A child seat which is mounted on and anchored to a vehicle seat having shoulder or lap belts, comprising:
   a child seat main body;
   engaging means attached to said child seat main body, said engaging means having a proximal end portion engageable with a fixed means attached to said vehicle seat and not to said shoulder or lap belts, and an intermediate portion of said engaging means being formed of an elongated flexible member; and
   locking means which is provided at said child seat main body said locking means being provided such that a distal end portion of said engaging means is fixed to said locking means and such that said intermediate portion of said engaging means is able to be wound around said locking means and is able to be withdrawn from said locking means, said locking means locking said child seat on said vehicle seat by preventing the withdrawal of said engaging means from said locking means when said engaging means is engaged with said fixed means and said engaging means is in a state of being retracted in said child seat main body.

2. A child seat according to claim 1, wherein said engaging means is engaged with said fixed means which is formed of one of a band-shaped member and a rigid body.

3. A child seat according to claim 1, wherein said engaging means is formed of one of a band-shaped member and an elongated flexible member.

4. A child seat according to claim 1, further comprising lock releasing means releasing said engaging means from a locked state in which movement of said engaging means is prevented by said locking means.

5. A child seat according to claim 1, wherein said locking means is provided with clamping means, said clamping means comprising a first clamping member provided in a direction orthogonal to the direction in which said engaging means is withdrawn from and retracted into said child seat, and a second clamping member provided on an opposite side of said engaging means and in opposing relation to said first clamping member, said engaging means being clamped between said first and said second clamping members.

6. A child seat according to claim 1, wherein said locking means includes an engaging means winding member, said engaging means winding member capable of retracting said engaging means in a layered-form.

7. A child seat according to claim 6, wherein said locking means includes a locking member, said locking member being capable of preventing rotation of said engaging means winding member in a direction in which said engaging means is withdrawn.

8. A child seat according to claim 7, wherein said locking member comprises a ratchet wheel fixed to said engaging means winding member, and a lock lever capable of engaging said ratchet wheel.

9. A child seat according to claim 7, wherein said locking member is an automatic locking retractor.

10. An anchoring structure for anchoring a child seat to a vehicle seat, having shoulder or lap belts, in a state in which said child seat is mounted on said vehicle seat, comprising:
   fixed means attached to said vehicle seat and not to said shoulder or lap belts and said fixed means formed of one of a band-shaped member and a rigid body;
   engaging means formed of an elongated flexible member, a proximal end portion of said engaging means being engageable with said fixed means; and
   locking means which is provided such that a distal end portion of said engaging means is fixed to said locking means and such that an intermediate portion of said engaging means is able to be wound around said locking means and is able to be withdrawn from said locking means, said locking means preventing the withdrawal of said engaging means when said engaging means is in the state of being engaged with said fixed means and said engaging means is in a state of being retracted into said child seat main body.

11. An anchoring structure according to claim 10, wherein said locking means is provided with clamping means, said clamping means including a first clamping member provided in a direction orthogonal to an elongated direction of said engaging means and a second clamping member provided on an opposite side of said engaging means and in opposing relation to said first clamping member, said engaging means being clamped between said first and said second clamping members.

12. An anchoring structure according to claim 10, wherein said fixed means includes, at one end thereof, an anchor plate of which a leading end is bent, and is held at a predetermined position by engaging with a shaft member provided in said vehicle seat.

13. An anchoring structure according to claim 10, wherein said locking means includes an engaging means winding shaft, said engaging means winding shaft being capable of retracting said engaging means in layered form.

14. An anchoring structure according to claim 13, wherein said locking means includes a locking member, said locking member preventing the rotation of said engaging means winding shaft in a direction in which said engaging means is withdrawn.

15. An anchoring structure according to claim 14, further comprising lock releasing means releasing said engaging means winding shaft from a locked state in which rotation of said engaging means winding shaft is prevented by said locking member.

16. An anchoring structure according to claim 15, wherein said locking member comprises a ratchet wheel fixed coaxially to one end portion of said engaging means winding shaft, and a locking lever which can engage said ratchet wheel.

17. An anchoring structure according to claim 15, wherein said locking member is an automatic locking retractor.

18. An anchoring structure according to claim 11, wherein said engaging means includes a hook member at one end of said engaging means.

19. An anchoring structure according to claim 18, wherein said fixed means includes a latch member at one end thereof, said latch member capable of being engaged with said hook member.

* * * * *